United States Patent
Bhattiprolu et al.

(10) Patent No.: US 9,575,739 B2
(45) Date of Patent: Feb. 21, 2017

(54) PERFORMING UNATTENDED SOFTWARE INSTALLATION

(71) Applicant: International Business Machines Corporation, Armonk, NY (US)

(72) Inventors: Sukadev Bhattiprolu, Beaverton, OR (US); Venkateswararao Jujjuri, Beaverton, OR (US); Haren Myneni, Tigard, OR (US); Malahal R Naineni, Tigard, OR (US); Badari Pulavarty, Beaverton, OR (US); Chandra Seetharaman, Portland, OR (US); Narasimha N Sharoff, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 13/787,493

(22) Filed: Mar. 6, 2013

(65) Prior Publication Data
US 2014/0259008 A1    Sep. 11, 2014

(51) Int. Cl.
G06F 9/445    (2006.01)

(52) U.S. Cl.
CPC .................................. G06F 8/61 (2013.01)

(58) Field of Classification Search
CPC ........................................................ G06F 8/61
USPC ........................................................ 717/174
See application file for complete search history.

(56) References Cited

U.S. PATENT DOCUMENTS

| | | | |
|---|---|---|---|
| 5,481,714 A * | 1/1996 | Pipkin et al. | 717/175 |
| 6,066,182 A * | 5/2000 | Wilde et al. | 717/175 |
| 6,963,981 B1 * | 11/2005 | Bailey | G06F 8/60 |
| | | | 726/22 |

(Continued)

OTHER PUBLICATIONS

IP.com, Method to Dynamically Address and Prevent Typical Installation Issues for a Desired Application Configuration, Jun. 29, 2012, 4 pages.

(Continued)

Primary Examiner — Francisco Aponte
(74) Attorney, Agent, or Firm — Lieberman & Brandsdorfer, LLC

(57) ABSTRACT

Systems and computer program products may perform unattended software installation. The systems and computer program products may include receiving a user's selection of one or more software installation files, and reading at least a portion of the one or more user-selected software installation files. The systems and computer program products may additionally include extracting, from the read one or more software installation files, questions that a user will be asked to answer during execution of the one or more user-selected software installation files, and compiling the extracted questions. The systems and computer program products may further include prompting a user to provide answers to the compiled questions, and receiving answers to one or more questions of the compiled questions prior to execution of the one or more user-selected software installation files. The systems and computer program products may additionally include storing the received answers, and providing the stored answers when requested during execution of the one or more user-selected software installation files.

18 Claims, 5 Drawing Sheets

(56) References Cited

U.S. PATENT DOCUMENTS

| | | | | |
|---|---|---|---|---|
| 7,266,818 | B2* | 9/2007 | Pike | G06F 8/61 709/222 |
| 7,596,615 | B2* | 9/2009 | Satkunanathan | H04L 61/2015 700/79 |
| 7,831,325 | B1 | 11/2010 | Zhang et al. | |
| 8,136,090 | B2* | 3/2012 | Boss | G06F 9/44505 717/120 |
| 8,156,489 | B2* | 4/2012 | Kane | G06F 8/61 717/175 |
| 8,166,472 | B2 | 4/2012 | Mantere | |
| 8,261,231 | B1* | 9/2012 | Hirsch | G06F 8/20 709/201 |
| 8,336,044 | B2* | 12/2012 | Wang | G06F 8/63 717/168 |
| 8,473,944 | B2* | 6/2013 | Boss | G06F 9/44505 717/121 |
| 8,726,270 | B2* | 5/2014 | Kane | G06F 8/61 717/171 |
| 8,839,222 | B1 | 9/2014 | Brandwine | G06F 8/65 717/168 |
| 8,959,504 | B2* | 2/2015 | Stern | G06F 9/44 717/171 |
| 8,997,090 | B2* | 3/2015 | Xu | G06F 8/61 717/174 |
| 2003/0037326 | A1* | 2/2003 | Burkhardt et al. | 717/178 |
| 2003/0046682 | A1* | 3/2003 | Crespo et al. | 717/178 |
| 2005/0251786 | A1* | 11/2005 | Citron | G06F 8/34 717/106 |
| 2005/0262503 | A1* | 11/2005 | Kane | 717/176 |
| 2006/0184934 | A1* | 8/2006 | Karlberg | H04M 1/72525 717/178 |
| 2007/0028229 | A1* | 2/2007 | Knatcher | 717/174 |
| 2007/0294688 | A1* | 12/2007 | Motoki et al. | 717/178 |
| 2008/0256529 | A1* | 10/2008 | Chaar | G06F 8/20 717/174 |
| 2009/0178034 | A1* | 7/2009 | Stern et al. | 717/174 |
| 2009/0249283 | A1 | 10/2009 | Bourdon | |
| 2010/0100610 | A1* | 4/2010 | Bezanson et al. | 709/220 |
| 2010/0192147 | A1* | 7/2010 | Kadota | G06F 8/61 717/178 |
| 2010/0242034 | A1 | 9/2010 | Rugh et al. | |
| 2010/0257517 | A1 | 10/2010 | Sriram et al. | |
| 2010/0325410 | A1* | 12/2010 | Fitzgerald et al. | 713/2 |
| 2011/0191743 | A1 | 8/2011 | Cope et al. | |
| 2012/0005465 | A1 | 1/2012 | Attanasio et al. | |
| 2012/0079448 | A1 | 3/2012 | Cope et al. | |
| 2012/0079471 | A1 | 3/2012 | Vidal et al. | |
| 2012/0079477 | A1 | 3/2012 | Boss et al. | |
| 2012/0260232 | A1* | 10/2012 | Hirsch | G06F 8/20 717/107 |

OTHER PUBLICATIONS

M. Aasbakken et al., Evaluation of User Engagement and Message Comprehension in a Pervasive Software Installation, Jun. 9, 2012, 4 pages.

David Both and Bruce Garland, Complete Kickstart: How to Save Time Installing Linux, Apr. 28, 2008, 23 pages.

\* cited by examiner

PERFORMING UNATTENDED SOFTWARE INSTALLATION

BACKGROUND

The present inventions generally relate to software installation technologies, and more specifically, to installation systems that prompt the user for input during the installation process.

Installing software on a computer system may involve running an installation program, such as a script. The installation program may obtain information about the computer receiving the installation, the preferences of the user conducting the installation, and/or other values or variables by prompting the user for input. For example, a program that updates a browser software package may generate a dialog box during the installation process to ask the user whether to import bookmarks from a prior browser. The program may pause the installation process while waiting for the user to respond. A program that intermittently seeks inputs from the user may force the user to actively attend to the installation process, which may become a time-consuming chore.

BRIEF SUMMARY

According to one embodiment, a computer network may include a processor and a memory. The computer system may additionally include a program comprising a plurality of instructions stored in the memory that are executed by the processor to receive a user's selection of one or more software installation files, and read at least a portion of the one or more user-selected software installation files. The plurality of instructions additionally comprises instructions that are executed by the processor to extract, from the read one or more software installation files, questions that a user will be asked to answer during execution of the one or more user-selected software installation files, and compile the extracted questions. The plurality of instructions further comprises instructions that are executed by the processor to prompt a user to provide answers to one or more questions of the compiled questions, and receive answers to one or more questions of the compiled questions prior to execution of the one or more user-selected software installation files. The plurality of instructions additionally comprises instructions that are executed by the processor to store the received answers, and provide the stored answers when requested during execution of the one or more user-selected software installation files.

According to one embodiment, a computer program product for performing unattended software installation may include at least one computer readable storage medium having computer readable program instructions embodied therewith. The computer readable program instructions, when read by a processor, may be configured to receive a user's selection of one or more software installation files, and read at least a portion of the one or more user-selected software installation files. The computer readable program instructions, when read by a processor, may additionally be configured to extract, from the read one or more software installation files, questions that a user will be asked to answer during execution of the one or more user-selected software installation files, and compile the extracted questions. The computer readable program instructions, when read by a processor, may be further configured to prompt a user to provide answers to the compiled questions, and receive answers to one or more questions of the compiled questions prior to execution of the one or more user-selected software installation files. The computer readable program instructions, when read by a processor, may be additionally configured to store the received answers, and provide the stored answers when requested during execution of the one or more user-selected software installation files.

Any of the above embodiments may be embodied as computer-based methods, systems, or program products.

DETAILED DESCRIPTION

Figure 1:
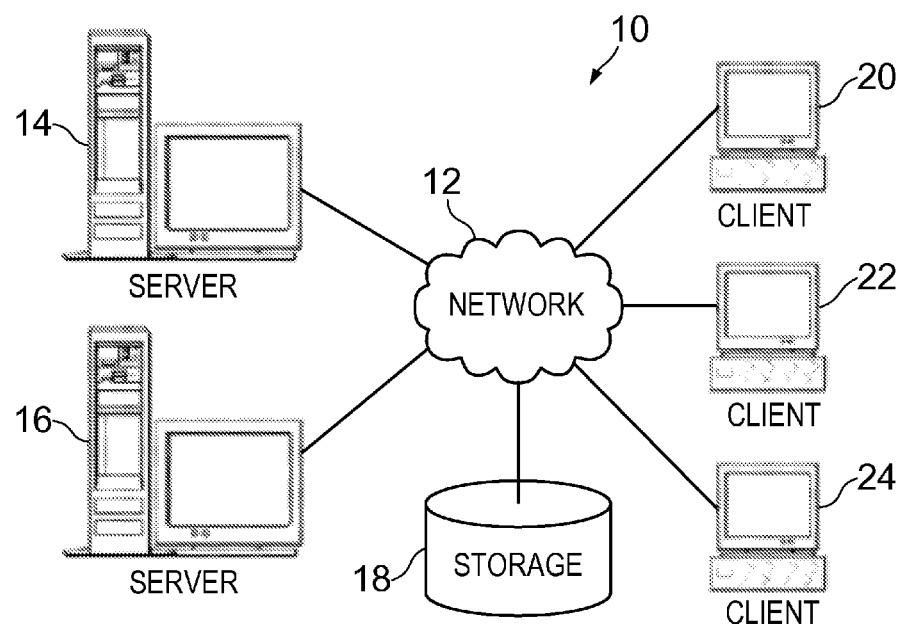
FIG. 1 is a pictorial representation of an example of a computer system in which illustrative embodiments may be implemented.

As will be appreciated by one skilled in the art, aspects of the present inventions may be embodied as a system, method, or computer program product. Accordingly, aspects of the present inventions may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present inventions may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventions may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventions are described below with reference to flowchart illustrations and/or block diagrams of methods, apparatus (systems) and computer program products according to embodiments of the inventions. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present inventions. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 2:
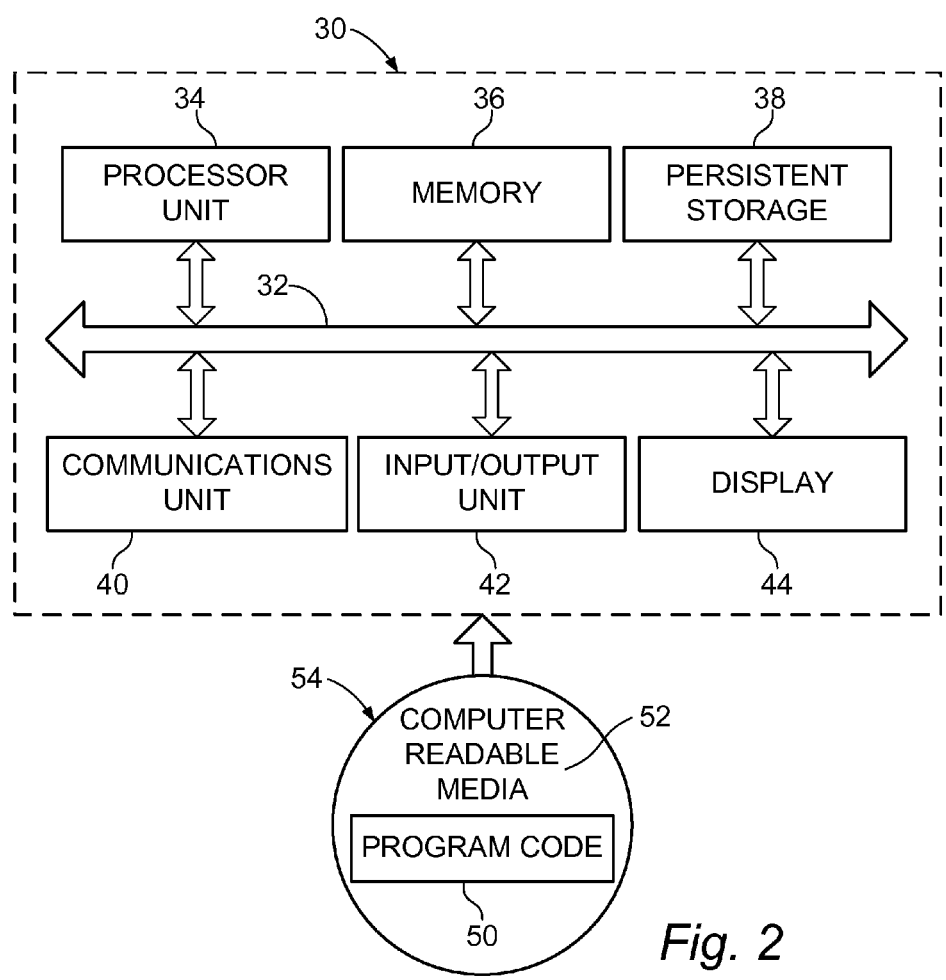
FIG. 2 is a block diagram of an example of a computer in which illustrative embodiments may be implemented.

With reference now to the figures and in particular to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a computer system, indicated generally at 10, and including a network of computers in which illustrative embodiments may be implemented. Computer system 10 may contain a network 12, which is the medium used to provide communications links between various devices and computers connected together within computer system 10. Network 12 may include connections, such as wire, wireless communication links, or fiber optic cables, or combinations of such connections.

In the depicted example, a server 14 and a server 16 may connect to network 12 along with a storage unit 18. In addition, one or more client computers may connect to network 12, such as a first client computer 20, a second client computer 22, and a third client computer 24. Client computers 20, 22, and 24 may be, for example, personal computers work stations, or network computers. In the depicted example, server 14 may provide data, such as boot files, operating system images, and/or software applications to client computers 20, 22, and 24. Client computers 20, 22, and 24 are clients to server 14 in this example. Computer system 10 may include additional servers, clients, and other devices not shown, or may include fewer devices than those shown.

In the depicted example, network 12 may be or may include the Internet. Computer system 10 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of an exemplary data processing system 30 is shown in which illustrative embodiments may be implemented. Data processing system 30 is an example of a computer, such as server 14 or client computer 20 in FIG. 1, in which computer-usable program code or instructions implementing the processes may be located for the illustrative embodiments. In this illustrative example, data processing system 30 may include communications fabric 32, which provides communications between a processor unit 34, a memory 36, a persistent storage 38, a communications unit 40, an input/output (I/O) unit 42, and a display 44. In other examples, a data processing system may include more or fewer devices.

Processor unit 34, also referred to simply as a processor, may serve to execute instructions for software that may be loaded into memory 36 from persistent storage 38. Processor unit 34 may be a set of one or more processors or may be a multi-processor core, depending on the particular implementation. Further, processor unit 34 may be implemented using one or more heterogeneous processor systems in which a main processor is present with secondary processors on a single chip. As another illustrative example, processor unit 34 may be a symmetric multi-processor system containing multiple processors of the same type.

Memory 36 and persistent storage 38 are examples of storage devices. A storage device is any piece of hardware that is capable of storing information either on a temporary basis and/or a permanent basis. Memory 36, in these examples, may be, for example, a random access memory or any other suitable volatile or non-volatile storage device. Persistent storage 38 may take various forms depending on the particular implementation. For example, persistent storage 38 may contain one or more components or devices. For example, persistent storage 38 may be a hard drive, a flash memory, a rewritable optical disk, a rewritable magnetic tape, or some combination of the above. The media used by persistent storage 38 also may be removable. For example, a removable hard drive may be used for persistent storage 38.

Communications unit 40, in these examples, provides for communications with other data processing systems or devices. For example, communications unit 40 may be a network interface card. Communications unit 40 may provide communications through the use of either or both physical and wireless communications links.

Input/output unit 42 allows for input and output of data with other devices that may be connected to data processing system 30. For example, input/output unit 42 may provide a connection for user input through a keyboard and mouse. Further, input/output unit 42 may send output to a printer. Display 44 displays information to a user.

Instructions for the operating system and applications or programs are located on persistent storage 38. These instructions may be loaded into memory 36 for execution by processor unit 34. The processes of the different embodiments may be performed by processor unit 34 using computer implemented instructions, which may be located in a memory, such as memory 36. These instructions are referred to as program code, computer-usable program code, or computer-readable program code that may be read and executed by a processor in processor unit 34. The program code in the different embodiments may be embodied on different physical or tangible computer-readable media, such as memory 36 or persistent storage 38.

Program code 50 may be located in a functional form on a computer-readable media 52 that is resident on a local or remote storage device or is selectively removable and may be loaded onto or transferred to data processing system 30 for execution by processor unit 34. Program code 50 and computer-readable media 52 form computer program product 54 in these examples. In one example, computer-readable media 52 may be in a tangible form, such as for example, an optical or magnetic disc that is inserted or placed into a drive or other device that is part of persistent storage 38 for transfer onto a storage device, such as a hard drive that is part of persistent storage 38. In a tangible form, computer-readable media 52 also may take the form of a persistent storage, such as a hard drive, a thumb drive, or a flash memory that is connected to data processing system 30. The tangible form of computer-readable media 52 is also referred to as computer-recordable storage media. In some instances, computer-recordable media 52 may not be removable.

Alternatively, program code 50 may be transferred to data processing system 30 from computer-readable media 52 through a communications link to communications unit 40 and/or through a connection to input/output unit 42. The communications link and/or the connection may be physical or wireless, or a combination of physical and wireless in the illustrative examples. The computer-readable media also may take the form of non-tangible media, such as communications links or wireless transmissions containing the program code. The different components illustrated for data processing system 30 are not meant to provide architectural limitations to the manner in which different embodiments may be implemented. The different illustrative embodiments may be implemented in a data processing system including components in addition to or in place of those illustrated for data processing system 30. Other components shown in FIG. 2 can be varied from the illustrative examples shown. As one example, a storage device in data processing system 30 is any hardware apparatus that may store data. Memory 36, persistent storage 38, and computer-readable media 52 are examples of storage devices in tangible forms.

In another example, a bus system may be used to implement communications fabric 32 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 36 or a cache such as found in an interface and memory controller hub that maybe present in communications fabric 32.

Systems, methods, and computer program products are disclosed herein for performing unattended software installation.

Figure 3:
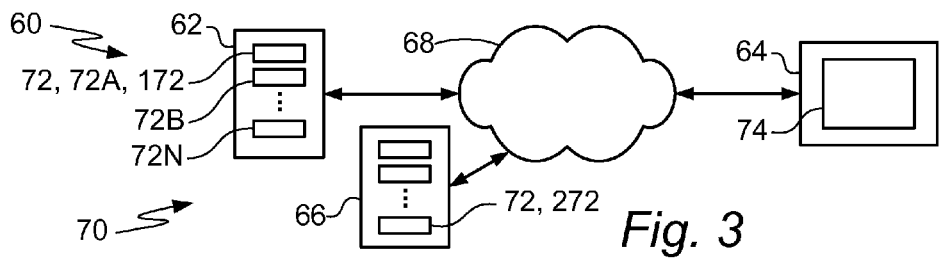
FIG. 3 is a block diagram of an example of a software installation system in accordance with the principles of the present inventions.

Referring now also to FIG. 3, a software installation system, indicated generally at 60 and also referred to as an "electronic apparatus," may include one or more administrative computers 62, target computers 64, file servers 66, networks 68, and package managers 70. System 60 may be an example of computer system 10. System 60 may include other, alternative, and/or additional elements and/or may omit one or more of the elements described.

Administrative computer 62 may be a computer or device used to manage a software installation process. For example, computer 62 may be a workstation accessible to an administrator, or other user, and used to conduct a local or remote installation process. Computer 62 may provide a remote-login interface to control software installation on, for example, a networked target computer, which may enable centralized administration of installations on multiple networked target computers.

Target computer 64 may be a computer or device that receives installed software 74. For example, when installing a Linux OS distribution, target computer 64 is a computer that, as a result of the installation, obtains a copy of the Linux OS. Computer 64 may be referred to as a client. Computer 62 and/or 64 may include storage devices, such as an optical drive, to read software installation files 72 from distribution media.

File server 66 may be a computer or device that stores files or data accessible to other computers via network 68. For example, server 66 may store one or more software installation files 72 in a location accessible to computers 62 and 64. During an installation process, computer 62 may download one or more installation files 72 (or portions of files 72, or data extracted or derived from files 72) via network 68. Server 66 may function as a computational or processing resource. For example, server 66 may execute instructions that read files 72, extract questions from files 72, send data to computers 62 and/or 64, etc.

Computers 62, 64 may be an example of client 20, 22, 24 and sometimes may be referred to as a "client." File server 66 may be an example of server 14, 16. Examples of computers or devices that may function as client or server 62, 64, 66 include workstations, personal computers, laptop computers, personal digital assistants, tablet devices, touch-screen devices, touch-pad devices, smart phones, cellular telephones, etc.

Network 68 may be any data-communication pathway between administrative computer 62, target computer 64, and/or file server 66. For example, if a user installs software from administrative computer 62 to a remote target computer 64, then network 68 may provide a communication link that passes files, data, and commands between computers 62 and 64. Examples of networks 68 include local or wide area networks, the Internet, and/or cloud-based services. Network 68 may include wired and/or wireless technologies. Network 68 may be an example of network 12.

FIG. 3 depicts a logical architecture of system 60 where computers 62, 64, 66 are distinct devices connected by network 68, for example, to allow a user at one computer 62 to download an installation file 72 from server 66 and to install software on a remote computer 64. Actual architectures may differ from that shown. One computer may perform more than one functional role, or a role may be distributed to more than one computer. Network 68 may be present or absent. For example, a user of a single, freestanding computer 62, 64, 66 may install software on that computer from a CD-ROM, independent from network 68.

Figure 4:
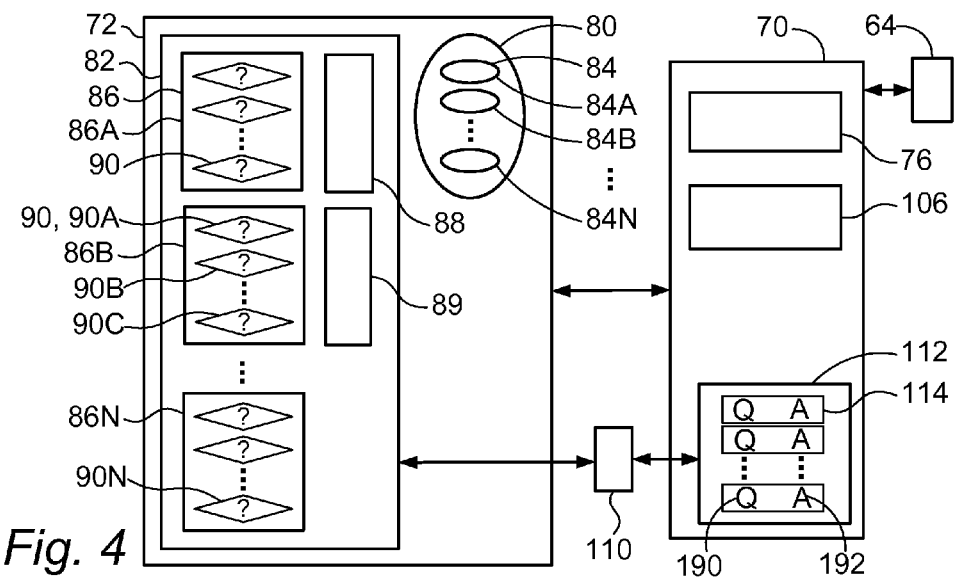
FIG. 4 is a block diagram of an example of a software installation file that includes software installation programs in accordance with the principles of the present inventions.

Referring now also to FIG. 4, package manager 70 may be a software tool or set of tools used to install, update, configure, uninstall, or otherwise maintain software packages on target computer 64. An example of a conventional package manager is RPM, used to install software on Linux systems. Package manager 70 may include an installation engine 76 that may provide features and functions that perform installation and maintenance operations on computer 64. For example, given a specified installation file 72, engine 76 may unpack compressed files, copy installable software and/or installation resources to computer 64, etc. The operations may execute instructions defined by installation resources, such as installation scripts included in or referenced by installation file 72.

Portions of package manager 70 may run on different computers 62, 64, 66. For example, server 66 may execute portions that extract and compile questions from files 72, while computer 62 or 64 may run portions that prompt a user to provide answers to compiled questions. Manager 70 may include other, alternative, and/or additional elements and/or may omit one or more of the elements described.

A software release may be provided in the form of one or more software installation file(s) 72. Installation file 72 may be an archive file that encapsulates other files. A file 72 that resides on computer 62 or 64 may be considered a local installation file 172. Examples of local files 172 include those read from hard drives, optical drives, and other devices installed on or accessible to computer 62 or 64. A file 72 that resides elsewhere (e.g., on server 66) may be considered a remote installation file 272. Remote files 272 may be downloaded to computer 62 and/or 64 and considered local files 172 when stored on computer 62/64. Remote files 272 may be executed over network 68 without downloading files 272. References to file 72 may include local 172 and remote 272 files. An installation file 72, 172, 272 may be referred to as a package file.

An installation file 72 may include installable software 80 and/or installation resources 82. Installable software 80 may include installable files 84, such as program files, data files, and/or other data to be installed on target computer 64, potentially after being selected, processed, compiled, or otherwise modified during installation. An installable file 84 may be local (e.g., provided as part of an installation file 72) or remote (e.g., downloaded during an installation process). Package manager 70 may include features and functions for checking identifiers, such as version numbers associated with installable software 80 or software files 84 and if applicable downloading updated versions. As a result of the installation process, installable software 80 becomes installed software 74.

Installation resources 82 may include installation programs or scripts 86, metadata 88, dependency data 89, and/or other files, data, or programs that, when executed, install software 74 from installation file(s) 72. Examples of installation scripts 86 include executable (interpreted or compiled) scripts, programs, macros, tools, and utilities used to perform an installation process. Metadata 88 may include information about software installed by installation file 72, such as product names, version numbers, etc. Dependency data 89 may include information about prerequisites of software installed by installation file 72. For example, dependency data 89 may take the form of a database of required or recommended hardware and software. Each installation resource 82 may be local (provided in installation file 72) or remote (downloaded during installation, such as to update a resource).

Given specified installation file(s) 72, package manager 70 may perform various tasks during the installation process, such as updating all or part of file(s) 72; checking target computer 64 for disk space and dependencies; uncompressing, decrypting, and validating file 72; patching and building installable software 80; uninstalling previous versions of installable software 80 from computer 64; moving installable software 80 to predetermined locations on computer 64; and configuring computer 64 to run installed software 74.

The phrase "package manager" includes software installation programs generally, such as installers, configuration utilities, and setup programs. The term "file" includes data generally, even if not represented as a file in a file system. "File" may, for example, include streamed data. "Installable software" and its variations includes any data placed on target computer 64 by an installation process, such as executable programs; software applications; binary, object, source, text, image, audio, video, or other data files; firmware; device drivers; plug-ins; etc. "Installable software" may include complete installations, upgrades, patches, single files, sets of files, etc. "Installable software" may include modifications of new or pre-existing files, such as changes applied to registry files or database records by an installation process. "Installing" and its variations may include uninstalling, updating, patching, and other software-maintenance tasks. "Installation script" and its variations include installation programs generally, such as interpreted scripts, compiled programs, macros, and other executable tools and utilities. "User" may include one or more persons or programs conducting, managing, or administering a software installation process. "A-N" notation may indicate an indefinite set, where "A" may refer to an instance of an item, "B" to another instance of the item, etc.

Installation resources 82 may include one or more scripts 86 that facilitate, perform, or automate all or part of the installation process. In the example of FIG. 4, resources 82 include a pre-install script 86A, an install script 86B, and a post-install script 86N. Script 86A may, for example, create directories, uncompress files, and check target computer 64 for disk space and dependencies. For example, script 86B may (if appropriate) compile source files and copy installable software 80 to specified locations of computer 64. Script 86C may, for example, configure computer 64 by changing registry or database entries and perform clean-up by deleting temporary files. This model of a multi-phase installation process, with each phase implemented by a distinct script 86A-N, is an example. Another implementation may employ a different architecture, for example, a design that performs all phases with one top-level script that calls other scripts or macros.

Figure 5:
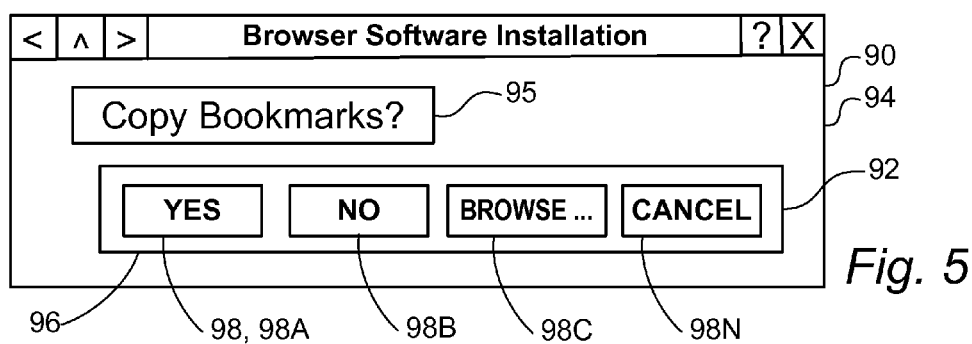
FIG. 5 shows a block diagram of an example of a question presented to a user when executing a software installation file to install a software package in accordance with the principles of the present inventions.

Referring now also to FIG. 5, an installation file 72 may include features that seek input from a user during an installation process. A feature or device presented to the user to seek input may be called a question 90, and a corresponding response from the user may be called an answer 92. For example, script 86 may include instructions that generate questions 90 and that read the values of the associated answers 92 provided by the user. Types of input sought may include preferences, configuration data, election of options, confirmation of input, etc.

In a command-line user interface, question 90 may take the form of a text-based prompt seeking command-line input. In a graphical user interface, question 90 may take the form of user-interface device 94, such as a dialog box. Question 90 may include an associated inquiry 95, such as text that describes the input sought. Question 90 may have an associated identifier, such as a coded ID, an assigned ID, or a distinguishing value or string.

Question 90 may have an associated response device 96 for receiving answer 92. In a command-line interface, a user may enter answer 92 as text, such as "Y" to accept an option or "N" to reject the option. In a graphical interface, a user may enter answers 92 via features, such as text boxes to enter text, browse buttons to locate files, radio buttons to select exclusive choices, accept or reject buttons to affirm or deny choices, etc. Answer 92 may have an associated identifier, potentially the same as that of the associated question 90.

Answer 92 may have more than one potential response. Each potential response is an option 98. For example, response device 96 may provide a set of radio buttons listing mutually exclusive options 98 or a set of check boxes allowing selection of multiple options 98. Each option may have an associated identifier, potentially including or derived from an identifier of the associated answer 92 or question 90. Each option 98 may have an associated value passed back to script 86 on acceptance or confirmation, for example, as a portion of answer 92. For example, entering text via a text box may return the entered text, clicking a reject button may return a digit 0, and clicking an accept button may return a digit 1. Each question 90 accordingly may have an associated answer 92 that may include one or more options 98 selected, elected, or rejected by the user in response to question 90.

When executing script 86 reaches question 90, script 86 may wait for the user to provide answer 92. The installation process consequently may pause until the user responds. On response, question 90 may pass the value associated with one or more elected or selected options 98 back to script 86, which may resume execution, until script 86 reaches subsequent question 90, if any. Script 86 with multiple questions 90 may pause many times during execution, until all questions 90 have been answered.

Figure 6:
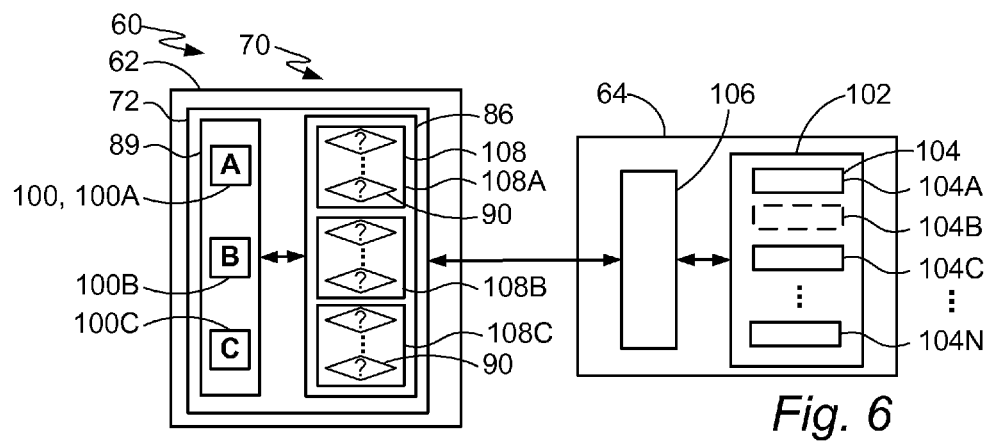
FIG. 6 shows a block diagram of an example of dependency relationships between a software package being installed and other installed software packages in accordance with the principles of the present inventions.

Referring now also to FIG. 6, installed software 74 may rely on other installed hardware or software. These prerequisites or relationships may be called dependencies. For example, a content management system (CMS) may rely on a database management system (DBMS) to store information used to generate web pages. The DBMS is a dependency of the CMS, which cannot operate without the DBMS. Dependencies may be hierarchical. For example, software installed by an installation file 72A may depend on software installed by another installation file 72B, which may depend on software installed by yet-another installation file 72C, etc. Installation file 72 may include dependency data 89, which may provide a list of zero or more dependencies 100 of software installed from installation file 72.

Target computer 64 may include installed hardware and software, which may collectively be called its target configuration 102. For example, configuration 102 of computer 64 may include one or more already-installed software packages 104A-N, each of which may have an associated version number. Package manager 70 may maintain on (or for) computer 64 a configuration database 106 to record information about computer 64 including its configuration 102. For example, database 106 may include data that identifies installed software packages 104A-N, data about dependency relationships between installed packages 104A-N, etc. Database 106 may be or may include a registry and may reside on computer 64.

When executing installation file 72 to install software 80, package manager 70 may read dependency data 89 for installation file 72 and query configuration database 106 for the status of one or more dependencies 100 on computer 64. If all dependencies 100 are present in configuration 102, the installation process may continue. If at least one dependency 100 is absent, manager 70 may, if appropriate, alert the user, install the dependency, abort the installation process, or otherwise address the missing dependency. When uninstalling installed package 104A, manager 70 may check database 106 for other installed packages 104B that depend on installed package 104A and (if appropriate) alert the user before uninstalling installed package 104A, reducing the risk of rendering other installed software 74B inoperable on computer 64.

In the example of FIG. 6, package manager 70, when installing software from installation file 72, reads dependency data 89 that lists dependencies 100A-C. Computer 64 with configuration 102 hosts an associated configuration database 106 that includes references to installed packages 104A-N. Dependency 100A is present on computer 64 as installed package 104A; dependency 100B is absent (indicated by dashes for not-installed package 104B); and dependency 100C is present as installed package 104C. Dependency 100B consequently should be satisfied by installing package 104B on computer 64 in order to run the software of installation file 72 on computer 64.

Different target computers 64 may differ in configuration 102. For example, computer 64A may have installed packages 104A and 104B but not installed package 104C, while computer 64B may have installed package 104C but not installed package 104A or 104B. Therefore, a query by package manager 70 to configuration database 106A of computer 64A may return a different result from a query to database 106B of computer 64B. Script 86 may include conditional instructions that depend on the result of one or more queries to database 106. Installing software from installation file 72 on different computers 64A or 64B consequently may, for example, trigger execution of different portions of script 86 according to whether dependencies 100 trigger or suppress instructions conditional on dependencies 100. Conditional instructions may include instructions that generate questions 90 addressed to the user. Questions 90 generated during execution of script 86 accordingly may differ from installation to installation as a result of different dependencies on different target computers 64.

Different instances of software installation conducted from installation file 72 may differ in one or more answer(s) 92 provided by the user. For example, when executing script 86A to install software on computer 64A, the user may reach a particular question 90A and elect option 98A. When executing script 86A to install software on another computer 64B, the user may reach question 90A and elect a different option 98B. Script 86 may include conditional instructions that depend on one or more answers 92 (or options 98) given to one or more questions 90. For example, electing option 98A may enable or disable execution of one portion of script 86, while electing another option 98B may enable or disable another portion of script 86. Instructions conditional on answers 92, like instructions conditional on dependencies 100, may include questions 90 addressed to the user, and the particular questions 90 generated during execution may differ from installation to installation as a result of answers 92 and/or elected options 98. For example, if a user accepts/declines an option to install a feature of the software 80 being installed, then script 86 may include/exclude one or more questions 90 associated with the accepted/declined feature.

A set 108 of questions 90 may be a block or group of one or more associated questions 90 generated by execution of script(s) 86. Set 108 of questions may include conditional or unconditional questions 90. For example, set 108 of questions may include one or more questions 90 conditional on dependencies 100 and/or conditional on one or more answers 92. FIG. 6 shows, for example, set 108A of questions associated with dependency 100A, another set 108B associated with dependency 100B, and yet-another set 108C associated with dependency 100C. In the example of FIG. 6, if configuration database 106 indicates that dependency 100A is satisfied, then script 86 may omit (or include, if applicable) set 108A; if dependency 100B is unsatisfied, then script 86 may include (or omit, if applicable) set 108B; etc.

Unconditional questions 90 may include questions 90 applicable to any installation, regardless of dependencies 100, answers 92, and/or other conditional selection. Set 108 of questions 90 may include unconditional questions 90. The particular questions 90 presented to the user when executing installation file 72 accordingly may include set(s) 108 of unconditional, dependency-conditional answer-conditional, and/or otherwise-selected questions 90.

Referring again to FIG. 4, package manager 70 may include (or communicate with) a user-input tool 110. The user-input tool may be understood as a portion, accessory, or subsystem of manager 70 that processes questions 90 and answers 92. Input tool 110 may be implemented as a freestanding utility that cooperates with other portions of manager 70 or as an integrated feature or capability of manager 70. Functionally, input tool 110 may receive a user's selection of one or more installation files 72, read at least a portion of the selected files, and extract questions 90 from the selected files, and process and store questions 90 as compiled questions 190. Input tool 110 may prompt the user for answers 92 to compiled questions 190, store the user's answers 92 as stored answers 192, and provide stored answers 192 to installation scripts 86 during actual installation. Input tool 110 or manager 70 thus may in effect respond to each question 90 generated during actual installation with a corresponding stored answer 192.

Package manager 70 may include a script or program that extracts questions 90 from specified installation files 72 by, for example, parsing scripts 86 present in or referenced by the selected file(s) 72. Manager 70 may present each question 90 or selected questions 90 to the user, receive corresponding answer 92 from the user, and store each answer 92 in input database 112 as stored answer 192. When executing installation file 72 to perform an actual installation and when script 86 reaches a question 90, manager 70 may intercept question 90, query input database 112 for the corresponding stored answer 192, and provide the stored answer 192 to script 86 by, for example, directly or indirectly passing stored answer 192 to executing script 86. Manager 70 may, if appropriate, confirm provided answer 192. Script 86 may continue with the installation based on the provided answer. Subsequent questions 90 are answered using respective stored answers 192. Manager 70, by extracting and compiling questions 90, prompting the user for answers 92, and storing stored answers 192 before actual installation, may act as a proxy for the user during actual installation, thereby enabling an unattended software installation.

Input database 112 may be any storage for question/answer data. For example, database 112 may be implemented with a custom or conventional DBMS. System 60 may support, for example, MySQL, which may be a convenient DBMS for implementing database 112. Database 112 may additionally or alternatively be implemented without using a DBMS. For example, a text file may be sufficient to store question-answer pairs and function as database 112, or an array may be sufficient to store run-time data and function as database 112.

Database 112 may include, for each question 90, a record 114 containing a compiled question 190 and/or a stored answer 192 given by the user to the corresponding question 90. Record 114 may include an identifier, such as a label, value, or string associated with the corresponding question 90. Additionally, record 114 may include data associated with the corresponding question 90, such as code extracted from a script 86, the text of inquiry 95, a sequence value assigned by manager 70, membership in one or more sets 108 of questions 90. Moreover, record 114 may include data that captures user interaction, such as coordinates, clicks, gestures, and/or keystrokes. Stored answer 192 similarly may include an associated label, identifier, string, value, return value, sequence value, program code, user interaction such as clicks, gestures, or keystrokes, or other distinguishing or identifying data. Additionally, stored answer 192 may include user-input data, such as text provided by the user in response to corresponding question 90; path, file, or URL names specified by the user; and/or value(s) identifying of one or more selected (or de-selected) options 98. Complied questions 190 and stored answers 192 may include data extracted from scripts 86 and/or data generated and assigned by manager 70. Each record 114 may include additional data, such as dependency data associated with question 90 or answer 92. Record 114 may include data not provided by a user. For example, manager 70 may be able to programmatically determine answer 192 by querying configuration 102 of computer 64 and may store the determined answer in record 114.

In an embodiment, input database 112 may be or include a database used by package manager 70 to store user-input data during a conventional installation. In other words, input database 112 may be a pre-existing database maintained by manager 70. In this embodiment, input tool 110 may store answer (input) data to input database 112 in a format expected by manager 70. Input tool 110 thus may imitate or replace other portions of manager 70 when maintaining input database 112. When conducting an actual installation by executing installation file(s) 72, manager 70 may query input database 112, find expected input data in an expected format, and proceed with actual installation.

In an embodiment, input tool 110 may function as a freestanding tool, utility, or script. Input tool 110 may read the specified installation files 72 to extract questions 90, prompt a user to provide an answer 92 to each question 90 or selected questions 90, and store each answer 92 in input database 112 as a stored answer 192. Input tool 110 or a user may invoke package manager 70, for example, with argument(s) that specify the same installation files 72. Input tool 110 in communication with manager 70 may, during installation, intercept each question 90 generated by executing installation files 72, query input database 112 for the corresponding stored answer 192, and provide stored answer 192 to manager 70. Manager 70 may thereby perform an unattended software installation.

In an embodiment, package manager 70 may be coded, configured, or specified to invoke input tool 110. For example, manager 70 may support macros or other features that can pass data to or from manager 70. A standard or customized macro may provide a feature that allows it to invoke input tool 110, for example. Manager 70, when it runs a macro that refers to input tool 110, may invoke input tool 110, which may then read the specified installation file 72, extract questions 90, store answers 92, and pass control back to manager 70. While manager 70 continues with the actual installation, input tool 110 may intercept each question 90 from manager 70 and provide the corresponding stored answer 192, enabling unattended installation.

In an embodiment, input tool 110 may be integrated with package manager 70. Input tool 110 accordingly may function as an internal subsystem of manager 70. Adding features of input tool 110 to manager 70 may include changing source code of manager 70 and/or input tool 110. The use of an open-source manager 70 may expedite the ability to make such changes.

Figure 7:
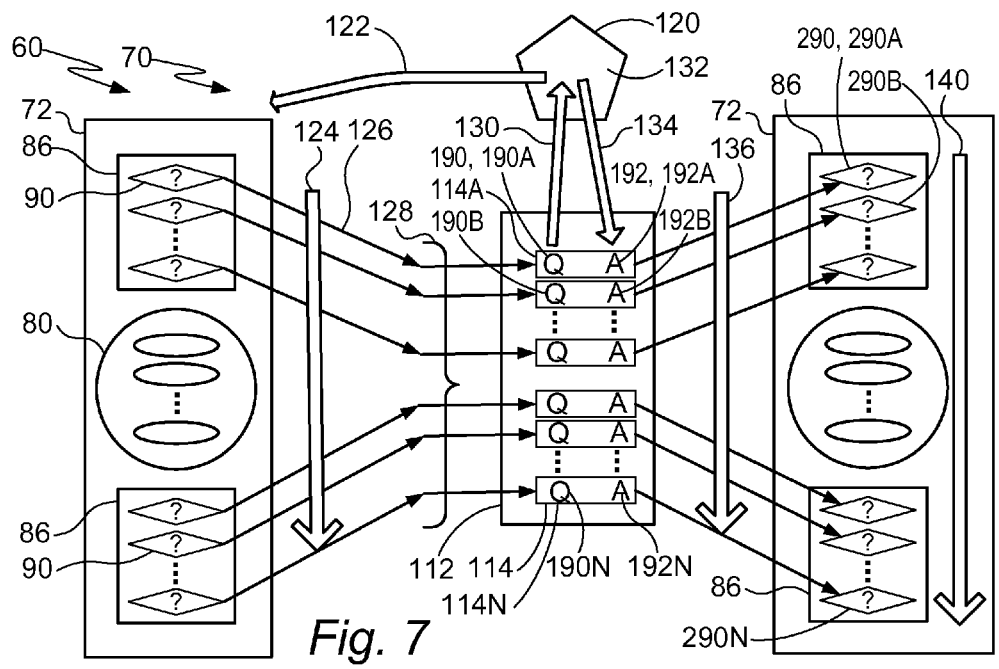
FIG. 7 shows a block diagram of an example of a software installation system in accordance with the principles of the present inventions.

Referring now also to FIG. 7, package manager 70 may perform a receiving operation 122 in which the package manager receives a user's selection of one or more software installation files 72. For example, a manager 70 that offers a command-line interface may offer a feature that allows user 120 to select file(s) 72, such as by entering a file name, URL, or other location at a prompt. Alternatively, manager 70 may offer a graphical interface that allows user 120 to browse a file system to select file(s) 72. Package manager 70 may read user input from the applicable user-interface feature and make the input available for other processing. For example, the package manager may, on user confirmation, read data that identifies selected file(s) 72 and store the data in variables, files, or other locations accessible to other functions of manager 70.

Package manager 70 may perform a reading operation 124 in which the package manager reads at least a portion of one or more selected software installation files 72. The package manager may decrypt and/or uncompress selected files 72, included installation resources 82, and/or installable files 84; update files 72, resources 82, and/or files 84, for example, by downloading newer versions; and identify scripts 86 or other selected portions of selected files 72. Package manager 70 may make the contents of files 72 available for other processing. The package manager may identify or locate questions 90, for example, via searching or parsing techniques, as described in more detail below.

Package manager 70 may identify portions of specified files 72. Examples of "portions of specified files" may include individual files 72 or components of a single file 72, such as its included scripts 86. For example, if user 120 specifies multiple files 72, then each file 72 may be identified as portion of the multiple specified files 72. Manager 70 thus may process multiple specified files 72 one file 72 at a time, for example, by applying the functionality of reading operation 124 through storing operation 134 to a first file 72; then, after storing received answers 92 of first file 72, applying the functionality of reading operation 124 through storing operation 134 to second file 72; and so on, until done with all files (portions) 72. Iterative processing similarly may proceed by script-by-script instead of (or in addition to) file-by-file.

Package manager 70 may perform extracting operation 126 in which the package manager extracts question(s) 90 from the read installation file(s) 72. In an embodiment, the package manager may parse files 72 or portions thereof to detect or identify questions 90. For example, file 72 may encode question 90 via distinctive structures, instructions, or other features that can be detected by search techniques, such as regular expressions or pattern-matching functions. Detected question 90 then may be extracted from file 72 by, for example, copying a block of instructions that encode detected question 90. Extracted questions 90 may be passed to other processing, as described below.

For example, a programming or scripting language used to encode a script 86 may define questions 90 via a predefined set of keywords. These distinctive keywords may provide a mechanism for identifying questions 90 by, for example, searching script(s) 86 for keywords as text strings using a regular expression parser or other search or pattern-recognition technique. For example, a scripting language might use a CONFIRM_BOX keyword to create a Yes/No question, an INPUT_FORM keyword to create a response form that may contain multiple options 98, etc. Searching scripts 86 for CONFIRM_BOX may detect a first instance of a Yes/No question; continuing the search may detect a second instance; etc. Similarly searching for INPUT_FORM may identify response forms—and so on for other selected keywords.

In an embodiment, the package manager may conduct a "dry run" installation as described elsewhere. For example, manager 70 may execute files 72 while enabling instructions that generate questions 90 and disabling instructions that change computer 64 and/or consume significant time without seeking user input. Package manager 70 may enable instructions that implement program logic selecting questions 90 generated during execution. The package manager may provide one or more answers 92 during dry-run execution to, for example, select a particular conditional execution path to trigger and detect associated questions 90. Package manager 70 may monitor or parse output to detect questions 90. Manager 70 accordingly may conduct an adapted installation process as a mechanism for extracting questions 90.

The package manager may collect and/or copy data that identifies, locates, or implements one or more detected questions 90. For example, for each detected question 90, package manager 70 may copy associated data, such as the text of inquiry 95, the values of identifiers, dependency relationships, membership in sets 108 of questions 90, program code that implements question 90, and the potential answers 92 of question 90. The package manager may save extracted question data to database 112. Additionally, package manager 70 may pass detected questions 90 to other processing, as further described below.

Package manager 70 may perform a compiling operation 128 in which the package manager compiles questions 90 extracted from specified installation file(s) 72. The package manager may save each extracted question 90 as a compiled question 190 in an associated record 114 of input database 112. Additionally, package manager 70 may update and maintain database 112. Moreover, the package manager may combine questions 90 extracted from multiple sources (such as multiple files 72 or scripts 86) into a single location by, for example, merging questions 90 from multiple sources into a common input database 112. That database may include data that identifies the source of each question 90. References to question 90 (a question in a script) sometimes may include question 190 (a question stored in database 112). References to answer 92 (an answer provided by user 120) similarly sometimes may include answer 192 (an answer stored in database 112).

Furthermore, the package manager may sequence extracted questions 90. For example, package manager 70 may save data that preserves a sequence observed during a dry-run execution of installation file 72, e.g., to expedite playback in the same sequence at provide 136. Alternatively, the package manager may sequence questions 90 based on relationships, dependencies, membership in sets 108, or other criteria. For sequenced question 90, compile 128 may include saving data to the associated record 114 to indicate the position of the question in the sequence.

Additionally, package manager 70 may identify one or more sets 108 of one or more extracted questions 90. For an identified set 108, the package manager may track membership by, for example, saving data to a record 114 associated with each member to indicate membership. Membership in set 108 may be a criterion used in other processing by manager 70. For example, the package manager may select questions 90 prompted to user 120 according to membership in one or more sets 108.

Sets 108 may be defined and detected in various ways. For example, set 108 may be defined by a logical relationship among questions 90. Detecting a relationship may include searching or parsing instructions of script 86 to, for example, locate keywords that define relationships. For example, a scripting language may include keywords, such as IF and FI, to delimit conditional blocks. Questions 90 between an opening IF and its terminal FI may comprise a set 108.

The package manager may identify sets 108 based on relationships between answers 92 and questions 90. For example, package manager 70 may identify a first set 108A of one or more questions 90 contingent or dependent on one or more answers 92 given to a second set 108B of one or more questions 90.

The package manager may perform prompting operation 130 in which it prompts user 120 and present questions 90 in the first (contingent or dependent) set 108A to the user only if the user provides specified answer(s) 92 to one or more questions 90 in the second (enabling) set 108B. For example, package manager 70 may identify question 90A of set 108A as being dependent on a YES answer of question 90B of set 108B. The package manager accordingly may present question 90A to user 120 only if user 120 provides a YES answer to question 90B.

Package manager 70 may select and/or sequence questions 90 or sets 108 according to dependency or contingency relationships identified during the compiling operation. For example, if the package manager identifies, during compiling operation, one or more questions 90A of first set 108A as dependent on one or more answers 92B to questions 90B of second set 108B, then the package may prompt user 120, during prompting operation 130, to provide answers 92B to questions 90B of second set 108B prior to prompting user 120 to provide answers 92A to questions 90A of first set 108A. This selection and/or sequencing may allow obtaining an enabling (or disabling) answer 92B before prompting an associated dependent question 90, for example, to include (or exclude) a dependent question 90 from prompting by prompt 130.

Package manager 70 may, as part of compiling operation 128, select at least one question 90 from a first set 108 of questions based on one or more answers 92 to a second set 108 of questions. The package manager accordingly may prompt user 120 to provide at least one answer 92 to selected question 90. Package manager 70 also may prompt user 120 for answers 92 to questions other than the selected question 90. For example, the package manager may, during compile 128, select a question 90A of set 108A as dependent on answer 92B of question 90B of set 108B. Package manager 70 accordingly may prompt user 120 to provide answer 92B by presenting associated question 90B to user 120. The package manager may prompt user 120 with questions 90 other than question 90B. For example, package manager 70 may present all questions of set 108B, not just selected question 90B of set 108B.

The package manager may, during compiling operation 128, identify sets 108 based on package dependency data 100. For example, package manager 70 may identify a package-dependent set 108 by querying database 106 and/or 112 and/or to identify questions 90 associated with a particular dependency 100. For example, the package manager may identify a first set 108A dependent on software package 104A, a second set 108B dependent on package 104B, etc. Manager 70 may query configuration database 106 to determine if packages 104A and 104B are present on computer 64. As part of prompting operation 130, manager 70 may present a set 108 of questions 90 with a given dependency to user 120 only if that dependency is satisfied (or unsatisfied) on computer 64. Continuing the example, if package 104A is present on computer 64, and package 104B is absent, then manager 70 may omit set 108A associated with installed package 104A and prompt set 108 associated with absent package 104B.

A question 90 may belong to more than one set 108 of questions. For example, a question 90A may depend on installed package 104A and on installed package 104B, both prerequisites of the software installed by selected files 72. Question 90A accordingly may be a member of a first set 108A associated with package 104A and also a member of a second set 108B associated with package 104B. Package manager 70 may select and prompt the same question 90/190 in more than one context as a result its membership in multiple sets 108. Continuing the example, manager 70 may prompt user 120 with question 90A if either package 104A or 104B is absent from computer 64.

The package manager may, as part of compiling operation 128, identify redundant extracted questions 90. A question 90 may be identified as redundant if, for example, duplicate or equivalent instances of the question exist in one or more files 72 or scripts 86 or if more than one branch of a script 86 calls the same question 90. If package manager 70 determines that user 120 has selected more than one file 72, the package manager may, as part of compiling operation 128, compare questions 90 among multiple selected files 72 to identify questions 90 that are redundant because they occur in more than one specified file 72. Additionally, package manager 70 may exclude redundant instances of questions 90 from the compiled questions 190 saved to database 112. For example, given three instances 90A,B,C of the same question 90, package manager 70 may store one instance 90A in database 112 as compiled question 190A and exclude the two redundant instances 90B,C. Additionally, the package manager may save data to the record 114 associated with the compiled question to indicate redundancy and/or identify excluded instances.

Package manager 70 may additionally, or alternatively, save redundant instances of questions to database 112 and may mark redundant instances as redundant. For example, given three instances 90A,B,C of the same question, the package manager may create three records 114, one for each instance 90A,B,C, and each associated record 114 may include data to indicate redundancy and/or identify other instances.

Redundant questions 90 may be considered a set 108 of questions. For example, three identical questions 90A,B,C may be considered a set 108 comprising questions 90A,B,C. Other processing of the package manager may evaluate questions for redundancy, for example, by reading redundancy data from database 112 to avoid redundant prompts to user 120.

For example, a question 90A may be identified as redundant because it belongs to more than one set 108, potentially triggering instances of question 90A. For example, a question 90A dependent on two absent packages 104A and 104B potentially may be prompted twice, once for package 104A and once for package 104B. Manager 70 may detect this redundancy to exclude duplicate instances of question 90A. An example of a mechanism for detecting redundant questions 90/190 may be to maintain a status value, such as a flag, for each question 90/190 in the associated record 114. When manager 70 selects a question 90 to prompt user 120, manager 70 may check its status value. If its status indicates "not selected," then manager 70 may select question 90, change its status to indicate "selected," and prompt user 120 with question 90. If its status indicates "selected," then manager 70 may exclude a redundant question 90 and rely on its answer 192 given elsewhere, for example, at the first instance of question 90 via prompt 130.

Package manager 70 may perform a prompting operation 130 in which the package manager prompts user 120 to provide answers 92 to one or more compiled questions 190. The package manager may read compiled question 190 from input database 112; present the compiled question 190 to user 120 (for example, by executing extracted code stored in record 114 or by generating code to agree with descriptive data in record 114); and wait for user 120 to provide an answer 92 to the compiled question 190. Package manager 70 may similarly read and present second and subsequent compiled questions 190 to user 120 obtain second and subsequent answers 92 until done.

In an embodiment, package manager 70 may, as part of prompting operation 130, concurrently present two or more questions 190 to user 120. For example, the package manager may read two or more questions 190, generate a form to combines the questions 190, present the form to user 120, wait for user 120 to complete and close the form, and pass the provided answers 92 to receive 132. Concurrent presentation may avoid or reduce the need to present questions 190 in series and separately wait for each answer 92.

In an embodiment, package manager 70 may execute all or part of the selected installation file(s) 72 and allow package manager 70 to generate and display questions 190. The package manager may then capture questions 90 and/or answers 92 provided by user 120 and pass questions 90 and/or answers 92 to its receiving operation 132. This embodiment may in effect conduct a dry-run installation as a mechanism for prompting user 120 for answers 92. To accelerate the process, the package manager may suppress selected operations to, for example, omit time-consuming operations.

In an embodiment, package manager 70 may select one or more compiled questions 190 from input database 112. That selection may include reading records 114 associated with questions 190 to obtain and consider set 108, sequence, or redundancy data, for example. Additionally, selection may include inclusion or exclusion of compiled questions 190 as prompts to user 120. For example, package manager 70 may exclude second and subsequent instances of a redundant question 190.

Additionally, package manager 70 may, as part of prompting operation 130, select compiled questions 190 based on an actual execution order recorded in input database 112. The package manager may sequence questions 190 or sets 108 of questions according to prerequisites, such as the value of one or more answers 92. For example, when package manager 70 identifies, as part of compiling operation 128, a first set 108A that is dependent on the answer(s) of a second set 108B, then the package manager may sequence, as part of the prompting operation 130, the second set 108B before the first set 108A. Obtaining an answer 92 that controls a dependent question 90 before asking the dependent question 90 may allow manager 70 to exclude questions 90 or sets 108 of questions that become inapplicable as a result of, for example, the known answer.

Sequencing may include identifying associations between questions 190. For example, a question 190A in a first set 108A may offer mutually exclusive options 98A and 98B. Option 98A may trigger question 190B of a second set 108B, and option 98B may trigger question 190C of second set 108B. The package manager accordingly may include sequencing question 190B only after selection of option 98A (excluding question 190C) and question 190C only after selection of option 98B (excluding question 190B).

Package manager 70 may generate a user-interface device 94 to present a selected question 190 to user 120. For example, package manager 70 may generate a dialog box that may include the associated inquiry 95, response device 96, and options 98. Device 94 may include executing or adapting instructions copied from the underlying installation file 72. For example, manager 70 may extract blocks of user-interface code associated with a question 90/190, store the code in input database 112 in the corresponding record 114, and query database 112 for the code to expedite generating device 94 for question 90/190.

The user interface of package manager 70 for prompting a question 190 may duplicate or resemble that of script 86. For example, for question 90 that (in script 86) generates dialog box 94, manager 70 may generate an equivalent dialog box. User 120, responding to the dialog box of manager 70, supplies the same input sought by script 86.

The package manager may pass one or more answers 92 to one or more other processing operations, such as a receiving operation 132. The passed data may include literal answers, answers encoded as values, identifiers to associate each answer 92 with a corresponding question 190, etc. Package manager 70 may pass each answer 92 or value separately, for example, to store each answer 92 or value when provided. Alternatively, the package manager may accrue answers 92 and pass the accrued set of answers as a batch.

Package manager 70 may perform a receiving operation 132 in which the package manager receives one or more answers 92 to prompted questions 190. The package manager may obtain answer 92 supplied by user 120 by, for example, reading answer 92 from device 94 on user confirmation. Package manager 70 may perform a storing operation 134 in which the package manager stores answers 92 in variables, files, or other accessible locations. Package manager 70 may alternate performing receiving operation 132 and storing operation 134 to incrementally store answers 92 in input database 112. The package manager alternatively may accrue answers 92 and pass the accrued answers as a batch. Package manager 70 may receive the answers prior to execution of installation operation 140 of the selected installation files 72.

In an embodiment, the package manager's operations of receiving at 122, reading at 124, extracting at 126, compiling 128, prompting at 130, and/or receiving at 132 may be implemented as a dry-run installation that executes specified files 72 and records questions 90 and answers 92. This embodiment may include suppressing selected instructions or operations that would otherwise occur when executing specified files 72 to install software. That suppression may include invoking manager 70 with options that disable portions of its operation. Additionally, the suppression may include configuring or implementing manager 70 to function as a supervisory program that controls the execution of scripts 86. For example, manager 70 may generally enable script instructions that do not change computer 64. For example, manager 70 may enable instructions that interact with user 120 (e.g., by displaying questions 90 and receiving answers 92), and that implement logic that controls execution (e.g., the presence and sequence of questions 90). Manager 70 may disable instructions, such as those that consume noticeable time without seeking user input. For example, manager 70 may suppress compilation, decompression, file-copy, and other relatively slow operations. Manager 70 thus may intercept questions 90 from an executing installation file 72 and answers 92 from user 120, save the intercepted questions 90 and answers 92 to input database 112, and avoid most of the time consumed by normal installation.

Manager 70 may subsequently execute an actual installation operation 140 by, for example, executing scripts(s) 86 without suppressing instructions that change target computer 64 and/or consume significant time. The package manager accordingly may install software on computer 64 and consume any amount of time required. During actual installation 140, manager 70 may supply stored answers 192.

Package manager 70 may store, at 134, one or more received answers 92 to input database 112. The package manager accordingly may write each answer 92 to an associated record 114. In database 112, an answer 92 may be referred to as a stored answer 192. Stored answer 192 may include a literal user-provided answer, associated values such as indexes and return values, data indicating selected (and/or deselected) options 98, data indicating user-interface operations such as clicks, keystrokes, and gestures, etc. For example, if question 90A has an associated record 114 in input database 112, then package manager 70 may write the corresponding received answer 92A, elected options 98, and so on to record 114.

After storing stored answers 192, package manager 70 may start actual installation operation 140 based on stored answers 192. Manager 70 may alternatively pause or shut down, for example, to wait for a signal or a user request before starting the actual installation. On pause or shut down, manager 70 may store status data. In an embodiment where input tool 110 is a freestanding portion of manager 70, input tool 110 may if appropriate pass data or control to other portions of manager 70.

Package manager 70 may perform a providing operation 136 in which it provides stored answers 192 when requested during execution of selected installation files 72. Execution that installs software provided by files 72 may be referred to as actual installation operation 140. The package manager providing the stored answers may occur in conjunction with the installation, for example, as a mechanism for automatically providing stored answers 192 in response to install-time questions 290 generated by installation 140. By supplying stored answers 192, the package manager may allow for an unattended installation.

Installation operation 140 may start directly after the package manager performs storing operation 134. For example, after user 120 provides an answer 92 to a last question 90, manager 70 may continue to installation operation 140, potentially without further interaction by user 120. The package manager alternatively may start the installation after a delay. For example, manager 70 may pause or shut down after storing operation 134, and the installation may start at a signal, on user request, or in a new session of manager 70. The package manager may read status data that lists specified files 72 and/or prompt user 120 to specify one or more files 72.

During installation operation 140, manager 70 may execute specified files 72 to install associated software. Those files may generate one or more questions 90, which may be referred during installation operation 140 as install-time questions 290. The package manager may, as part of providing operation 136, detect questions 290 generated during installation 140 by, for example, monitoring output of executing scripts 86. For each detected question 290, package manager 70 may identify question 290 and query input database 112 to obtain corresponding stored answer 192. For each detected question 290, the package manager may pass the obtained stored answer 192 to the executing file 72 as a response to the corresponding question 290. Passing answer 192 may occur programmatically (e.g., via memory, variables, macros, files, or the like) by replaying user interaction (e.g., by repeating stored clicks, gestures, keystrokes, or the like). Additionally, package manager 70 may confirm or cancel answers 192, for example, when appropriate to advance from one question 290 to next question 290.

For example, user 120 may invoke package manager 70 with data that specifies installation file(s) 72. When manager 70 executes instructions to display a first question 290A, manager 70 may detect a first question 290A, look up the corresponding answer 192A in input database 112, provide the answer 192A in response to question 290A, and if appropriate confirm answer 192A. Manager 70 may continue executing file 72, until file 72 reaches a second question 290B. Manager 70 may similarly provide answer 192B to question 290B, and so on for subsequent questions if any, until manager 70 completes the installation. Manager 70 thus may act as a proxy for user 120 during installation operation 140 and thereby may enable an unattended software installation.

For questions identified as redundant by package manager 70 during compiling operation 128, the package manager may, as part of providing operation 136, provide the associated answer 192 for each instance of the redundant question. For example, the package manager may store one instance 90A of a redundant question 90A,B,C as compiled question 190A and exclude instances 90B,C. During installation, executing installation files 72 may generate all three instances of 90A,B,C as install-time questions 290A,B,C. The package manager accordingly may provide the associated stored answer 192A when it each install-time instance 290A,B,C.

Some operations of package manager 70 may execute on a file server 66, and other operations may execute on a client—in other words, on computer 62 and/or computer 64. For example, receiving operation 122, reading operation 124, extracting operation 126, and compiling operation 128, may execute on server 66; and prompting operation 130, receiving operation 132, storing operation 134, and providing operation 136 may execute on client 62/64. Manager 70 accordingly may include further operations to allow communication between server 66 and client 62/64. For example, server 66 may send compiled questions 190 to client 62/64 via network 68, and client 62/64 may receive compiled questions 190 sent by server 66. In addition, client 62/64 may download specified files 72 from server 66, for example, in order to execute the installation locally of the client computer that will receive the installed software. A networked environment may enable other distributions of operations 122 through 136 among computers 62, 64, and 66. Other architectural distributions may include other or different "send," "receive," and "download" operations adapted to the structure in use.

Figure 8:
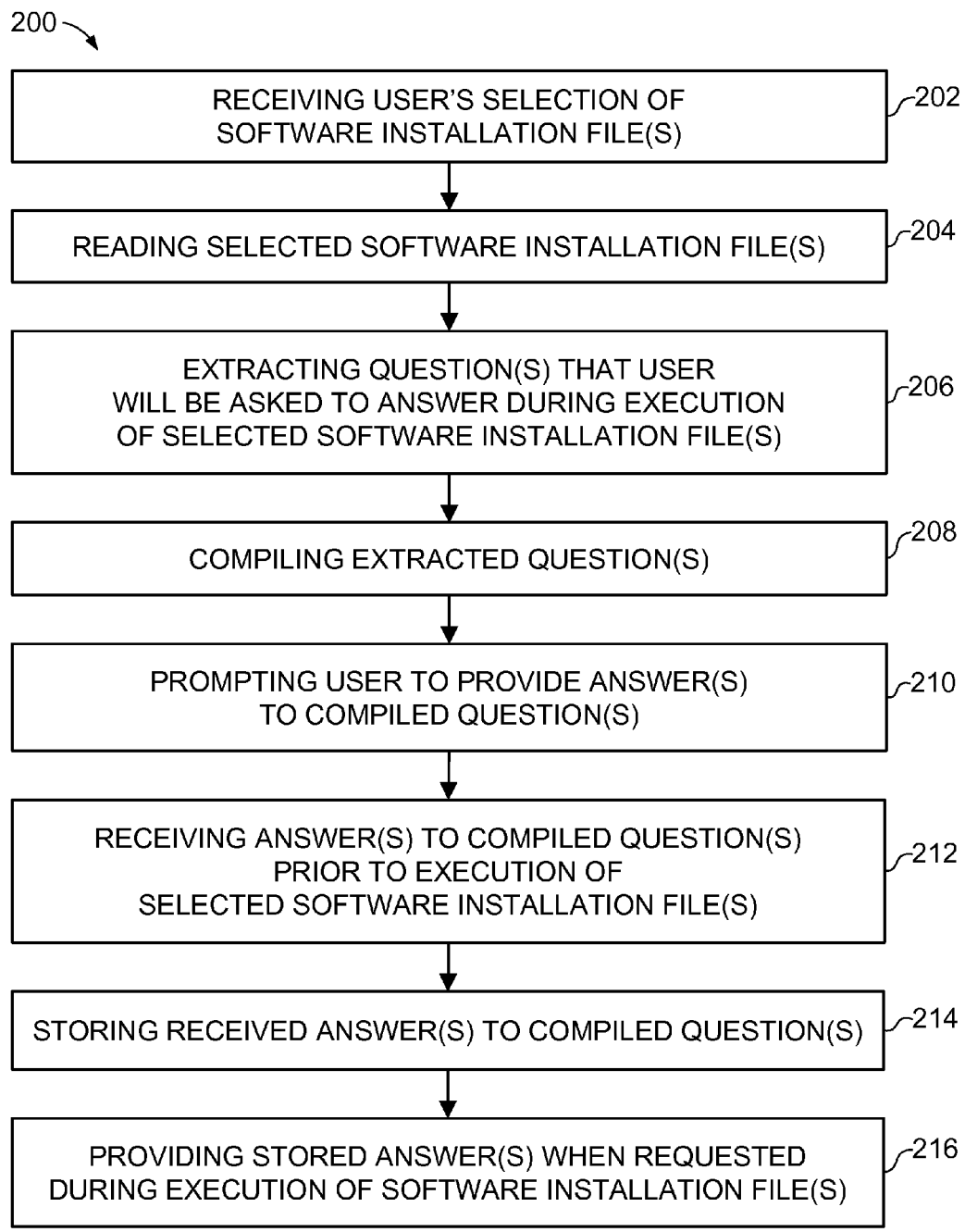
FIG. 8 shows an example of a method for performing unattended software installation in accordance with the principles of the present inventions.

Referring now also to FIG. 8, a method 200 for providing stored answers 192 to questions during software installation may include receiving at 202, by an electronic apparatus, user's 120 selection one or more software installation files 72; reading at 204 the selected files 72; extracting at 206 from files 72 questions 90 that a user 120 will be asked to answer during execution of files 72; compiling at 208 the extracted questions 90; prompting at 210 user 120 to provide answers 92 to compiled questions 90; receiving at 212 answers 92 to compiled questions 90/190 prior to execution 140 of the selected files 72; storing at 214 answers 92 to compiled questions 90/190; and providing at 216 stored answers 192 when requested during execution 140 of the selected installation files 72. Method 200 may include other, alternative, or additional elements; may omit one or more elements; and/or may follow a different sequence of elements from that listed.

Receiving at 202 generally may include features and capabilities of receiving operation 122. For example, receiving 202 may include providing a user interface device that prompts the user to select one or more files 72, reading data that identifies the selection from the device on confirmation, and storing the data to a variable or other location accessible to other features of manager 70.

Reading at 204 generally may include features and capabilities of reading operation 124. For example, reading 204 may include reading at least a portion of selected files 72, decrypting and/or uncompressing selected files 72, updating files 72 and/or included resources 82 and/or files 84, identifying scripts 86 or other selected portions of selected files 72, and making the contents of files 72 available to other processing by package manager 70. Reading 204 and/or extracting 206 may include parsing selected files 72, for example, to identify or locate questions 90 that user 120 will be asked to answer during execution of selected files 72.

Extracting 206 generally may include features and capabilities of extracting operation 126. For example, extracting 206 (and/or reading 204) may include parsing files 72 to locate questions 90. Extracting 206 may include copying data from files 72 that identifies, locates, characterizes, and/or implements detected questions 90 that a user 120 will be asked to answer when installing software by executing selected files 72. Copied data may include (for example) inquiry 95, identifiers, values, dependency data, and program instructions that implement detected question 90 including potential answers 92, and potential options 98.

In an embodiment, extracting 206 may include executing a "dry run" installation as detailed elsewhere to allow executing files 72 to generate questions 90, for example, to dynamically extract questions 90 from output generated during the dry-run installation.

Compiling 208 generally may include features and capabilities of compiling operation 128. For example, compiling 208 may include saving each extracted question 90 to an associated record 114 of input database 112, thereby compiling and maintaining database 112 of compiled questions 190. Compiling 208 may include storing data associated with compiled questions 90/190, such as data indicating sequence, contingency, redundancy, dependency on configuration, dependency on answers 92, membership in sets 108, etc.

For example, when installing browser software, question 90A may have an associated answer 92A that allows user 120 to accept or decline an option to import bookmarks from a previously installed browser, and question 90B may ask the user for an answer 92B that identifies a file containing bookmarks. Question 90B, contingent on answer 92A of question 90A, does not apply if user 120 declines the option to import bookmarks. Compiling 208 accordingly may include identifying storing data in records 114A and 114B indicating the logical relationship between questions 90A and 90B.

Compiling 208 may include identifying a first set 108 of questions 90 that are dependent on answers 92 to a second set 108 of questions 90. When compiling 208 identifies a first set 108 dependent on one or more answers of a second set 108, prompting 210 may include prompting a user to provide answers 92 to questions 90 of second set 108 prior to prompting user 120 to provide answers to questions 90 of the second set 108. Sequencing prompting 210 so that dependent questions follow controlling answers of enabling questions may allow prompting 210 to omit one or more questions from the first (dependent) set.

When compiling 208 identifies a first set 108 dependent on one or more answers of a second set 108, compiling 208 may include selecting at least one question from the first set 108 based on answer(s) to the second set 108. For example, a question 90 in the second set 108 may offer mutually exclusive options 98A and 98B. A first question 90A in the first set 108 may depend on option 98A and never apply to option 98B. A second question 90B in the first set may depend on option 98B and never apply to option 98A. Compiling 208 accordingly may including selecting question 90A for option 98A and selecting question 90B for option 98B.

Prompting 210 generally may include features and capabilities of prompting operation 130. For example, prompting 210 may include reading compiled questions 190 from input database 112, presenting questions 190 to user 120, and waiting for user 120 to provide answers 92 to prompted questions 190. Provided answers 92 may pass to other processing, such as that of receiving 212.

Receiving 212 generally may include features and capabilities of receiving operation 132. For example, receiving 212 may include obtaining one or more answers 92 provided by user 120 in response to one or more compiled questions 190 presented via prompting 210. Receiving 212 may include storing answers 92 in variables, files, or other accessible locations, for example, to pass received answers 92 to other processing, such as that of storing 214. Receiving 212 may occur prior to the actual installation 140 conducted by executing selected installation files 72.

Storing 214 may include features and capabilities of storing operation 134. For example, storing 214 may include writing each received answer 92 to database 112 as stored answer 192 of the associated record 114. Storing 214 may include storing data that identifies selected files 72. Storing 214 may include passing control to other processing, such as that of providing 216. Storing 214 may include pausing or shutting down package manager 70, for example, to conduct an actual installation 140 (including providing 216) in a later session of manager 70.

Providing 216 may include features and capabilities of providing operation 136. For example, during installation operation 140, manager 70 may execute specified files 72 and install installable software 80. During installation operation 140, files 72 may generate one or more install-time questions 290. Providing 216 may include detecting questions 290, for example, by monitoring output of executing files 72. For each question 290, providing 216 may include querying database 112 to obtain a stored answer 192. Providing 216 may include passing the stored answer 192 to the executing file 72 as a response to the corresponding question 290 and if appropriate confirming the provided answer 192. By providing stored answers 192, manager 70 may act as a proxy of user 120, thereby enabling an unattended software installation operation.

Portions of method 200 may execute on a file server 66, and portions of method 200 may execute on a client, such as a target computer 64, potentially in conjunction with an administrative computer 62. For example, receiving 202, reading 204, extracting 206, and compiling 208 may execute on server 66; and prompting 210, receiving 212, storing 214, and providing 216 may execute on client 62/64. Method 200 accordingly may further include sending, by server 66, compiled questions 190 to client 62/64. Sending compiled questions 190 may include transmitting questions 190 to client 62/64 via network 68, for example. Method 200 may further include receiving, by client 62/64, questions 190 from server 66. Receiving questions 190 may include detecting a transmission from server 66 on network 68, reading a file saved by server 66 to a shared location, or other data-exchange techniques. Method 200 may further include downloading, by client 62/64, specified files 72 from server 66. For example, client 62/64 may obtain local copies of installation files 72 in order to execute actual installation 140 locally instead of remotely over network 68.

Reading 204 may include reading a portion of selected installation files 72 and (subsequent to storing 214 received answers 92/192) reading the remainder of files 72. For example, given two specified files 72A and B, method 200 may include reading 204 first file 72A, saving received answers 92 of file 72A via storing 214, and then reading second file 72B (which is the remaining portion of specified files 72A and B) and saving received answers 92 of file 72B via storing 214. For another example, given one specified file 72 that includes two scripts 86A and B, method 200 may include reading first script 86A, saving received answers 92 of script 86A via storing 214, and then reading second script 86B and saving answers 92 of script 86B via storing 214. In general, method 200 may include identifying first, second, and subsequent portions of files 72 and iteratively reading 204 and storing 214 each portion.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A software installation system, comprising:
a processor in communication with memory;
an electronic apparatus in communication with the processor, the electronic apparatus comprising a file server, at least one computer, a set of installation tools, and a database;
the database having at least one previously answered question;
the file server to receive a selection of one or more software installation files for installing software via the set of installation tools, including receiving the selection of a first software installation file for installing first software; and
the set of installation tools to:
  initialize unattended installation of the first software prior to execution of the first software installation file, including the set of installation tools to:
    extract, from the first software installation file, one or more questions to answer during execution of the first software installation file;
    compile the one or more extracted questions;
    compare the compiled questions to the previously answered question, wherein the comparison excludes any redundant question from the compiled questions;
    store the compiled questions in the database;
    issue a first prompt to the computer in order to answer the one or more compiled questions;
    receive one or more answers corresponding to the first prompt; and
    store the received answers in the database; and
  perform the unattended installation of the first software on the computer during execution of the first software installation file, including the set of installation tools to:
    provide the stored answers when requested, including the set of installation tools to query the database to obtain the stored answers;
    read first dependency data of the first software, wherein the first dependency data relates to a dependency requirement for installing the first software; and
    complete installation of the first software on the computer based on the read first dependency data and the stored answers.

2. The software installation system of claim 1 further comprising the computer to download the first software installation file from the file server, wherein the download allows for local installation of the file on the computer.

3. The software installation system of claim 1, further comprising the set of installation tools to read an unread portion of the first software installation file subsequent to storing the received answers.

4. The software installation system of claim 1, wherein compiling the extracted questions further comprises the set of installation tools to identify a first set of questions of the extracted questions that are dependent on answers to a second set of questions of the extracted questions, and further comprising the set of installation tools to:
  issue a second prompt to answer the second set of questions;
  select less than all questions from the first set of questions based on the answers to the second set of questions; and
  issue a third prompt to provide at least one answer to the less than all questions.

5. A computer program product for performing unattended software installation by an electronic apparatus, the computer program product comprising at least one computer readable storage medium having computer readable program code embodied therewith, the program code when executed by a processor to:
  receive, at a file server of the electronic apparatus, a selection of one or more software installation files view a set of installation tools of the electronic apparatus, including receiving the selection of a first software installation file for installing first software;
  initialize unattended installation of the first software prior to execution of the first software installation file, including program code to:
    extract, by the set of installation tools, one or more questions from the read first software installation file to answer during execution of the first software installation file;
    compile, by the set of installation tools, the one or more extracted questions;
    compare, by the set of installation tools, the compiled questions to a previously answered question in a database, wherein the comparison excludes any redundant question from the compiled questions;
    store, by the set of installation tools, the compiled questions in the database of the electronic apparatus;
    issue, by the set of installation tools, a first prompt to a computer of the electronic apparatus in order to answer the one or more compiled questions;
    receive, by the set of installation tools, one or more answers corresponding to the first prompt; and
    store, by the set of installation tools, the received answers in the database; and
  perform the unattended installation of the first software on the computer during execution of the first software installation file, including program code to:
    provide the stored answers when requested during execution of the first software installation file, including program code to cause the set of installation tools to query the database to obtain the stored answers;
    read first dependency data of the first software installation file, wherein the first dependency data relates to a dependency requirement for installing the first software; and
    complete installation of the first software on the computer based on the read first dependency data.

6. The computer program product of claim 5, further comprising program code to download the first software installation file from the file server, wherein the download allows for local installation of the file on the computer.

7. The computer program product of claim 5, further comprising program code to read, by the set of installation tools, an unread portion of the first software installation file subsequent to storing the received answers.

8. The software installation system of claim 1, wherein the first dependency data comprises a list of zero or more dependencies, and wherein the installation of the first software is completed in response to determining a presence of all dependencies read from the first dependency data.

9. The software installation system of claim 8, further comprising the set of installation tools to determine an absence of at least one dependency, and to address the absence of the at least one dependency prior to completion of the first software installation.

10. The software installation system of claim 9, wherein each dependency of the dependency data corresponds to a respective package installation, and wherein determining the absence of a dependency comprises determining an absence of an installed package.

11. The software installation system of claim 1, wherein the questions are selected from the group consisting of: unconditional questions, conditional questions, and a combination thereof.

12. The software installation system of claim 11, wherein the conditional questions are selected from a group consisting of: dependency-conditional questions, answer-conditional questions, and a combination thereof.

13. The computer program product of claim 5, wherein the first dependency data comprises a list of zero or more dependencies, and wherein the installation of the first software is completed in response to determining a presence of all dependencies read from the first dependency data.

14. The computer program product of claim 13, further comprising program code to determine, by the set of installation tools, an absence of at least one dependency, and to address, by the set of installation tools, the absence of the at least one dependency prior to completion of the first software installation.

15. The computer program product of claim 14, wherein each dependency of the dependency data corresponds to a respective package installation, and wherein determining the absence of a dependency comprises determining an absence of an installed package.

16. The computer program product of claim 5, wherein the questions are selected from the group consisting of: unconditional questions, conditional questions, and a combination thereof.

17. The computer program product of claim 16, wherein the conditional questions are selected from a group consisting of: dependency-conditional questions, answer-conditional questions, and a combination thereof.

18. The computer program product of claim 5, wherein compiling the extracted questions further comprises program code to identify a first set of questions of the extracted questions that are dependent on answers to a second set of questions of the extracted questions and further comprising program code to:
  issue, by the set of installation tools, a second prompt to answer the second set of questions;
  select, by the set of installation tools, less than all questions from the first set of questions based on the answers to the second set of questions; and
  issue, by the set of installation tools, a third prompt to provide at least one answer to the less than all questions.

* * * * *